United States Patent
Zhang

(10) Patent No.: US 10,591,752 B1
(45) Date of Patent: Mar. 17, 2020

(54) METHOD FOR ADJUSTING PRESCRIPTION EYEGLASSES AT A REMOTE LOCATION BASED ON MEASURED DATA OF A USER'S OF THE EYEGLASSES

(71) Applicant: Songchao Zhang, Mong Kok (HK)

(72) Inventor: Songchao Zhang, Mong Kok (HK)

( * ) Notice: Subject to any disclaimer, the term of this patent is extended or adjusted under 35 U.S.C. 154(b) by 95 days.

(21) Appl. No.: 15/974,559

(22) Filed: May 8, 2018

Related U.S. Application Data

(60) Provisional application No. 62/502,941, filed on May 8, 2017.

(51) Int. Cl.
*A61B 3/11* (2006.01)
*G02C 13/00* (2006.01)
*G02C 11/00* (2006.01)
*G02B 27/32* (2006.01)

(52) U.S. Cl.
CPC .......... *G02C 13/003* (2013.01); *G02B 27/32* (2013.01); *G02C 11/10* (2013.01)

(58) Field of Classification Search
CPC ............ A61B 3/112; A61B 3/111; A61B 3/11
USPC .............................. 351/204, 200, 246, 45, 46
See application file for complete search history.

(56) References Cited

U.S. PATENT DOCUMENTS

2018/0024385 A1* 1/2018 Pfeiffer ................ G02C 13/005
                                                                351/204

* cited by examiner

*Primary Examiner* — Hung X Dang
(74) *Attorney, Agent, or Firm* — Plager Schack LLP

(57) ABSTRACT

A method for adjusting prescription eyeglasses at a remote location based on measured data of a user of the eyeglasses is disclosed. With measurement decals adhered to lenses of the prescription glasses customized for a patient, an optometrist, optician, ophthalmologist, online optical merchant, or supplying lab will be able to have a physical measurement of the patient's segment height and monocular and binocular pupillary distance for improved fitting, thereby providing more comfortable single vision, bifocal and progressive prescription glasses, all without the need for an office visit or additional fees.

10 Claims, 3 Drawing Sheets

METHOD FOR ADJUSTING PRESCRIPTION EYEGLASSES AT A REMOTE LOCATION BASED ON MEASURED DATA OF A USER'S OF THE EYEGLASSES

CLAIM OF BENEFIT TO PRIOR APPLICATION

This application claims benefit to U.S. Provisional Patent Application 62/502,941, entitled "METHOD FOR ADJUSTING PRESCRIPTION EYEGLASSES AT A REMOTE LOCATION BASED ON USER'S MEASURED DATA," filed May 8, 2017. The U.S. Provisional Patent Application 62/502,941 is incorporated herein by reference.

BACKGROUND

Embodiments of the invention described in this specification relate generally to prescription eyeglasses worn by individuals, and more particularly, to a method for adjusting prescription eyeglasses at a remote location based on measured data of a user of the eyeglasses.

An individual interested in purchasing prescription eyeglasses typically has to visit an optician, optometrist or ophthalmologist to measure the pupillary distance and segment height of the user. The pupillary distance is the distance between the individual's pupils. The segment height is the distance between the bottom of the eyeglass frame and the bottom of one of the user's pupils.

It is problematic when individuals purchase prescription eyeglasses online by themselves. This is because it is difficult for the user to measure his/her segment height and pupillary distance without the help of others. This often results in inaccurate measurements, which can result in the making of poor fitting prescription eyeglasses. There exist several methods to estimate these measurements for online purchased prescription eyeglasses. However, there are instances where these measurements are inaccurate. Additionally, in the shipping of eyeglasses to the patient, it is possible for the lenses to become scratched.

As such, there is a need in the industry for a method for adjusting prescription eyeglasses at a remote location that addresses the limitations of the prior art.

BRIEF DESCRIPTION

A novel method is disclosed for adjusting prescription eyeglasses at a remote location to enhance fit based on measured data of a user of the eyeglasses. In some embodiments, the method comprises (i) providing an eyeglass frame with a pair of lenses secured therein, (ii) adhering a measurement decal over each lens of the pair of lenses, the measurement decal comprising pupillary distance ruler markings and segment height ruler markers disposed thereon, (iii) capturing a front image of the eyeglass frame and measurement decals when disposed around a head and centered over eyes of the user, (iv) submitting the front image to the remote location, and (v) performing an adjustment to the eyeglass frame and lenses at the remote location based on the front image.

In some embodiments, the measurement decal is disposed on a sheet that is provided for use with a prescription eyeglass. In some embodiments, the sheet comprises a transparent sheet having pupillary distance ruler markings and segment height ruler markers disposed thereon. In at least one embodiment, an adhesive is disposed on the sheet and covered by a removable protective sheet.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
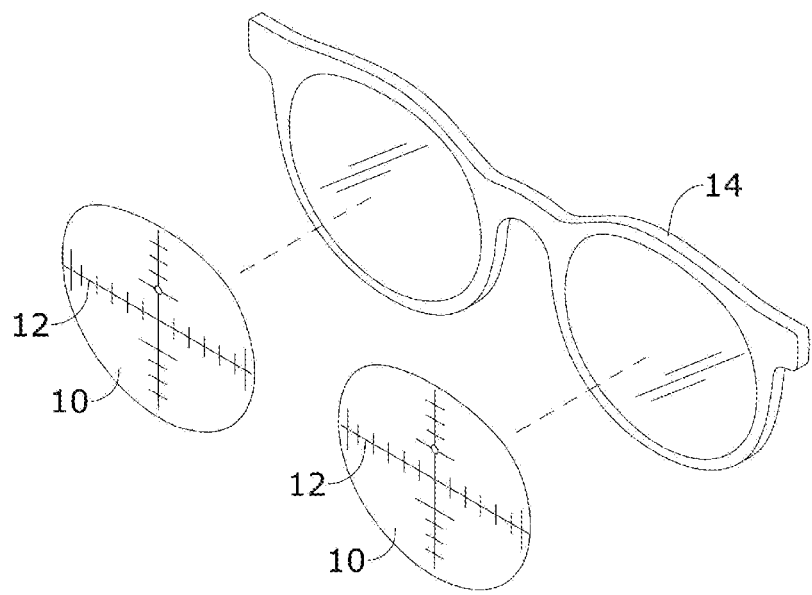
FIG. 1 conceptually illustrates a pair of measurement decals that adhere to the lenses of eyeglasses in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel method is disclosed for adjusting prescription eyeglasses at a remote location to enhance fit based on measured data of a user of the eyeglasses. In some embodiments, the method comprises (i) providing an eyeglass frame with a pair of lenses secured therein, (ii) adhering a measurement decal over each lens of the pair of lenses, the measurement decal comprising pupillary distance ruler markings and segment height ruler markers disposed thereon, (iii) capturing a front image of the eyeglass frame and measurement decals when disposed around a head and centered over eyes of the user, (iv) submitting the front image to the remote location, and (v) performing an adjustment to the eyeglass frame and lenses at the remote location based on the front image.

In some embodiments, the measurement decal is disposed on a sheet that is provided for use with a prescription eyeglass. In some embodiments, the sheet comprises a transparent sheet having pupillary distance ruler markings and segment height ruler markers disposed thereon. In at least one embodiment, an adhesive is disposed on the sheet and covered by a removable protective sheet.

As stated above, an individual interested in purchasing prescription eyeglasses typically has to visit an optician, optometrist or ophthalmologist to measure the pupillary distance and segment height of the user. The pupillary distance is the distance between the individual's pupils. The segment height is the distance between the bottom of the eyeglass frame and the bottom of one of the user's pupils. It is problematic when individuals purchase prescription eyeglasses online by themselves. This is because it is difficult for the user to measure his/her segment height and pupillary distance without the help of others. This often results in inaccurate measurements, which can result in the making of poor fitting prescription eyeglasses. There exist several methods to estimate these measurements for online purchased prescription eyeglasses. However, there are instances where these measurements are inaccurate. Additionally, in the shipping of eyeglasses to the patient, it is possible for the lenses to become scratched. Embodiments of the method for adjusting prescription eyeglasses at a remote location to enhance fit based on measured data of a user of the eyeglasses described in this specification solve such problems by providing an accurate measurement of the segment height and monocular and binocular pupillary distance that the patient can photograph and upload to the supplier. With this information, the supplier will be able to verify measurements and more accurately remake the lenses if needed. This information will also then be available for future orders to improve their accuracy.

In some embodiments, the remote location is a location of an eyeglass supplier. In some embodiments, the eyeglass supplier is at least one of a commercial eyeglass supplier, an eyeglass manufacturer, and an eyeglass factory. In some embodiments, the remote location includes data communication hardware, computing device hardware, and network communication infrastructure sufficient to enable data communication between the user of the eyeglasses and the remote location.

In some embodiments, the measurement decal is transparent having pupillary distance ruler markings and segment height ruler markers disposed thereon. In some embodiments, the measurement decal is shaped to adhere to one lens of the prescription eyeglasses of the user. In some embodiments, a pair of measurement decals are provided to the user along with the prescription eyeglasses, with each measurement decal to the adhered to a separate lens of the prescription eyeglasses.

In some embodiments, one or more of the following steps are performed in the method when a pair of separate measurement decals are provided to a user. The user at his/her home location or an office adheres each measurement decal to a lens of the eyeglasses. The lenses may or may not be prescription lenses. Each measurement decal is centered on the front of the lens such that the pupillary distance ruler markings and segment height ruler markers are properly oriented relative to the user's eyes when the eyeglass is worn.

The user captures a front image of the eyeglass frame, lenses, measurement decals and eyes when the eyeglass frame is worn. The front image can be captured using any type of camera known in the field such as a digital camera, smartphone camera, electronic tablet, or the like. The image is uploaded to a computing device accessible to the supplier at the remote location.

In some embodiments, the computing device is a cloud server that includes a cloud application service to which users can upload front images of their eyeglasses being worn with measurement decals adhered to the lenses and from which the supplier can either download the front images or the front images can automatically be transferred to a supplier computing device at the remote location of the supplier. For example, a website which provides the cloud service for users to upload and the supplier to retrieve or receive the front images. In some other embodiments, the computing device is a supplier computing device that allows direct transfer of images from users to the remote location of the supplier.

After uploading the front image, the user continues to wear the prescription eyeglass as normal unless there are any visual problems. If the user needs an adjustment to the prescription eyeglass, he/she ships the prescription eyeglass to the remote location.

At the remote location, the supplier/factory performs an adjustment on the prescription eyeglass based on pupillary distance and segment height data from the image. The supplier/factory ships the adjusted eyeglass to the user. These steps can be performed as many times as needed. In an alternative embodiment, the supplier/factory assembles a new prescription eyeglass based on the front image and ships the new eyeglass to the user. The supplier/factory saves the data corresponding to the front image for future use.

To make the measurement decal adhesives with ruler markings to use in the method for adjusting prescription eyeglasses at a remote location of the present disclosure, the measurement decal adhesives with ruler markings should be transparent and clearly marked for optical centers of lenses and scaled both horizontally and vertically, and accurately aligned to the physical prescription glasses. Color markings can be provided in some embodiments to enhance measurement accuracy.

By way of example, FIG. 1 conceptually illustrates a pair of measurement decals 10 that adhere to the lenses of eyeglasses 14. As shown in this figure, horizontal and vertical markings 12 are disposed on the measurement decals 10. The horizontal and vertical markings 12 include pupillary distance ruler markings and segment height ruler markers. Aside from the horizontal and vertical markings 12, the measurement decals are transparent, allowing for a clear image of the eyes of the patient when the patient is wearing the eyeglasses with the measurement decals 10 in place on the lenses of the eyeglasses.

Figure 2:
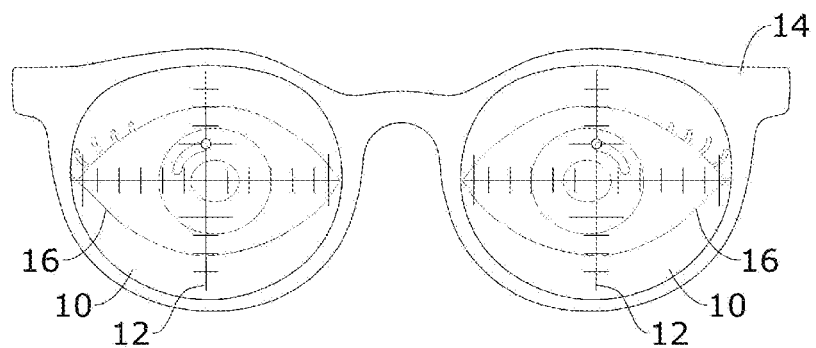
FIG. 2 conceptually illustrates a front image of the measurement decals adhered to the lenses of the eyeglasses while a patient is wearing the eyeglasses in some embodiments.

Now turning to FIG. 2, which conceptually illustrates a front image of the measurement decals 10 adhered to the lenses of the eyeglasses 14 while a patient is wearing the eyeglasses 14. As shown in this figure, the patient's eyes 16 are positioned behind the lenses of the eyeglasses 14 such that the horizontal and vertical markings 12 of the measurement decals 10 are aligned as near to directly in front of the patient's eyes 16.

In some embodiments, the measurement decal is disposed on a sheet that is provided for use with a prescription eyeglass. In some embodiments, the sheet comprises a transparent sheet having pupillary distance ruler markings and segment height ruler markers disposed thereon. In at least one embodiment, an adhesive is disposed on the sheet and covered by a removable protective sheet.

In some embodiments, one or more of the following steps are performed in the method when the measurement decal is disposed on the sheet. The user at his/her home location or an office removes the sheet's protective sheet and adheres the sheet around an eyeglass frame with a pair of lenses. The lenses may or may not be prescription lenses. The sheet is centered on the front of the eyeglass frame and lenses such that the pupillary distance ruler markings and segment height ruler markers are properly oriented relative to the user's eyes when the eyeglass is worn.

The user captures a front image of the eyeglass frame, lenses, sheet and eyes when the eyeglass frame is worn. The front image can be captured using any type of camera known in the field such as a digital camera, smartphone camera, electronic tablet, or the like. The image is uploaded to a computing device and transferred to the remote location. For example, the user may connect to a website that hosts an image uploading service whereby the supplier/factory can retrieve or receive the image. The user continues to wear the prescription eyeglass as normal unless there are any visual problems. If the user needs an adjustment to the prescription eyeglass, he/she ships the prescription eyeglass to the remote location.

At the remote location, the supplier/factory performs an adjustment on the prescription eyeglass based on pupillary distance and segment height data from the image. The supplier/factory ships the adjusted eyeglass to the user. These steps can be performed as many times as needed. In an alternative embodiment, the supplier/factory assembles a new prescription eyeglass based on the front image and ships the new eyeglass to the user. The supplier/factory saves the data corresponding to the front image for future use.

It shall be appreciated that embodiments of the invention permit an optometrist, optician, ophthalmologist or the supplying lab to have a physical measurement of the patient's segment height and monocular and binocular pupillary distance for improved eyeglass fitting. This will provide the user more comfortable single vision, bifocal and progressive prescription glasses.

In alternative embodiments, transparent scaled plastic can be used on faces for video/photos to generate 3D models of an individual's face or head with accurate measurements. Along with 3D models of frames, people can try fittings of eyeglass frames in three dimensions virtually.

Figure 3:
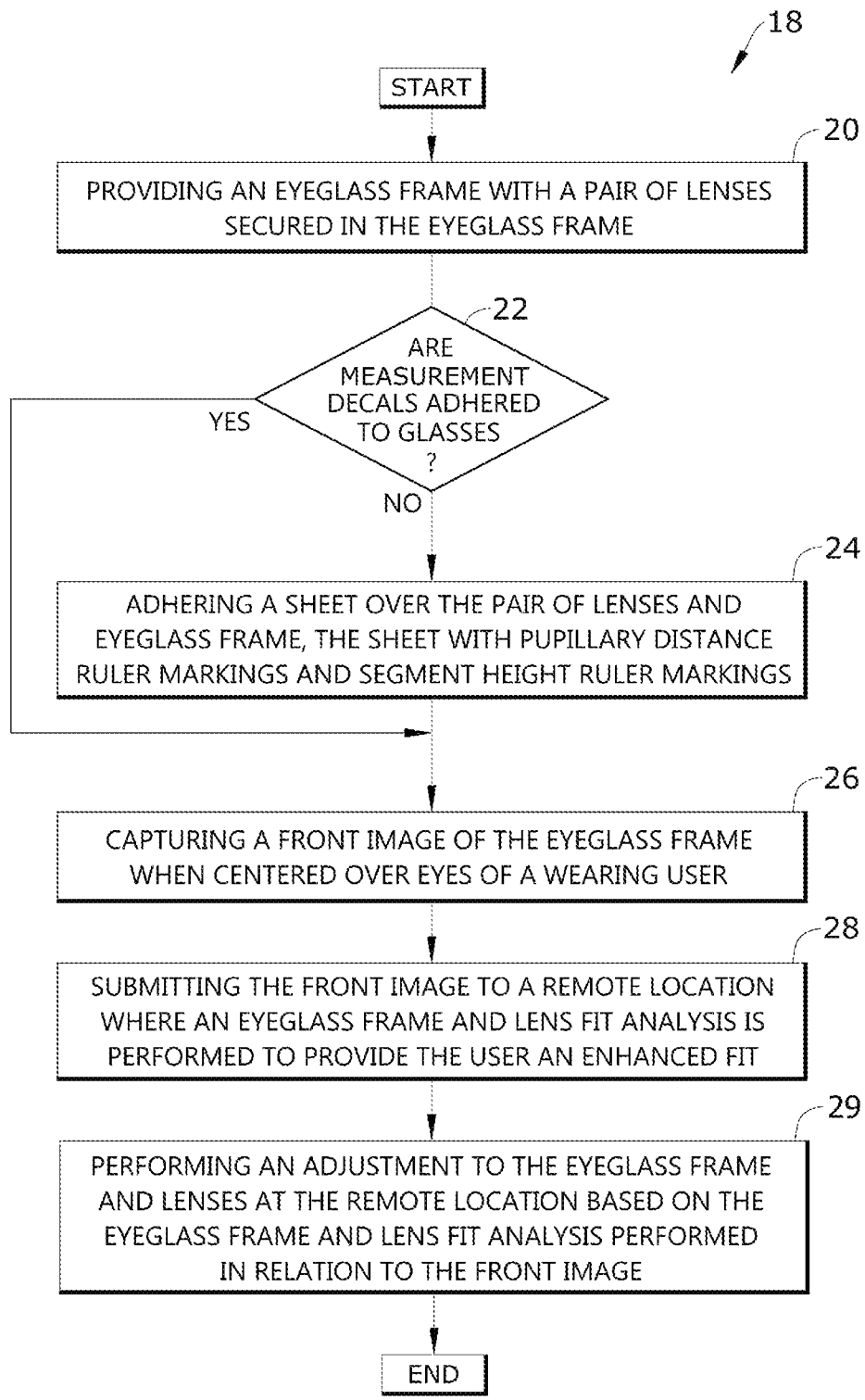
FIG. 3 conceptually illustrates a method for adjusting prescription eyeglasses at a remote location to enhance fit based on patient's measured data in some embodiments.

By way of example, FIG. 3 conceptually illustrates a method for adjusting prescription eyeglasses at a remote location 18 to enhance fit based on patient's measured data. As shown in this figure, the method for adjusting prescription eyeglasses at a remote location 18 starts with providing (at 20) an eyeglass frame with a pair of lenses secured in the eyeglass frame. For example, an online optical merchant may provide prescription glasses such as eyeglasses 14 described above by reference to FIGS. 1 and 2.

In some embodiments, the method for adjusting prescription eyeglasses at a remote location 18 proceeds to determining (at 22) whether measurement decals are adhered to the eyeglasses. In some embodiments, the eyeglasses 14 are provided with measurement decals, such as the measurement decals 10 described above by reference to FIGS. 1 and 2. However, in some embodiments, the eyeglasses 14 are provided with a transparent sheet that includes the horizontal and vertical markings of the measurement decals, but which is adhered over the eyeglasses by the user after the patient receives the eyeglasses from the online optical merchant. Accordingly, when measurement decals are not provided with the eyeglasses, the method for adjusting prescription eyeglasses at a remote location 18 then proceeds to adhering a sheet over the pair of lenses and eyeglasses frame (at 24). Like the measurement decals 10 described above by reference to FIGS. 1 and 2, the sheet includes pupillary distance ruler markings and segment ruler markings. On the other hand, when measurement decals are provided with the eyeglasses, then the measurement decals will be adhered to the pair of lenses that are secured in the eyeglass frame, and the method for adjusting prescription eyeglasses at a remote location 18 can proceed to the next step of capturing an image.

In some embodiments, the method for adjusting prescription eyeglasses at a remote location 18 captures a front image (at 26) of the eyeglass frame when centered over eyes of the user wearing the eyeglasses. For example, the eyeglass frame 14 described above by reference to FIG. 2 is centered over the user's eyes 16. Whether the measurement decals are adhered directly to the lenses of the eyeglasses, or a sheet is adhered over the eyeglass frame, the captured image is centered when the pupillary distance ruler markings and segment ruler markings are centered, as shown in and described above by reference to FIG. 2.

Next, the method for adjusting prescription eyeglasses at a remote location 18 of some embodiments submits the captured image to a remote location (at 28) where an eyeglass frame and lens fit analysis is performed by the optical merchant or other specialist to provide the user an enhanced fit of the eyeglasses. In some embodiments, when needed by the user, the method for adjusting prescription eyeglasses at a remote location 18 then performs an adjustment (at 29) to the eyeglass frame and lenses at the remote location based on the eyeglass frame and lens fit analysis performed by the optical merchant (or other specialist) in relation to the captured front image. Then the method for adjusting prescription eyeglasses at a remote location 18 ends.

The method for adjusting prescription eyeglasses at a remote location to enhance fit based on measured data of a user of the eyeglasses described in this specification differs from and improves upon currently existing options for remotely adjusting eyeglasses based on user's measured data. In particular, the conventional way to perform measurements of pupillary distance either requires an office visit by the user/patient or relies on the user/patient taking their own measurement using a standard ruler, which can often be inaccurate. There is no existing method for measurement of segment height without the frame being on the patients face because each frame is different and the segment height will vary from frame to frame and face to face.

In addition, when a patient orders a pair of prescription glasses online, they are not expecting to need an office visit, and most offices charge additional fees to verify the accuracy of online eyeglass orders. However, the method for adjusting prescription eyeglasses at a remote location to enhance fit based on measured data of a user of the eyeglasses provides an adhesive on the physical prescription glasses customized for a patient, thereby allowing an optometrist, optician, ophthalmologist or the supplying lab to be able to have a physical measurement of the patient's segment height and monocular and binocular pupillary distance for improved fitting. This will provide more comfortable single vision, bifocal and progressive prescription glasses, all without the need for an office visit or additional fees.

The various elements of the method for adjusting prescription eyeglasses at a remote location to enhance fit based on measured data of a user of the eyeglasses of the present disclosure may be related in the following exemplary fashion. It is not intended to limit the scope or nature of the relationships between the various elements and the following examples are presented as illustrative examples only. The measurement decals may be put on the lenses of the eyeglasses/prescription glasses customized for the specific patient, and the measurement markings and scales are to be aligned with the glasses optical centers accurately, otherwise the measurement may deviate from an ideal setting for the specific prescription glasses and patient combination. The patient's photos wearing prescription glasses with the measurement decal adhesives is better taken in well-lit environment and as close to straight on as possible to allow for clear images of the vertical and horizontal scales as well as precise interpretation of the images.

In some embodiments, when the measurement decals are adhered to a sheet, the sheet with the scaled measurement decal adhesives can be extended and put on the temples (along the eyeglass frame arms), and side photos of the user/patient wearing the sheet can be used to measure fitting of temple length.

The method for adjusting prescription eyeglasses at a remote location to enhance fit based on measured data of a user of the eyeglasses of the present disclosure generally works by following the above-listed steps, in the order listed, patient's segment height and pupillary distance can be measured against the specific prescription glasses, resulting in more accurate prescription glasses and comfortable vision.

To use the method for adjusting prescription eyeglasses at a remote location to enhance fit based on measured data of a user of the eyeglasses of the present disclosure, a patient (or user) would perform the following steps:

1. Order and receive eyeglasses.
2. Before removing the measurement decal adhesives, capture a photographic front image of the eyeglasses on the user's face, using good lighting and trying to take the picture as straight as possible.
3. Upload the front image to the remote location of the supplier/factory (e.g. the website or cloud application service designated by the supplier/factory for image uploading).
4. Remove the measurement decal adhesives, thereby allowing the user/patient to enjoy the new eye wear.
5. If there are any problems with vision, the user/patient would contact supplier/factory to verify the measurements are correct because the supplier/factory would use the image to measure the segment height and pupillary distance for verification, accuracy, and improved fitting (with better quality control).

Figure 4:
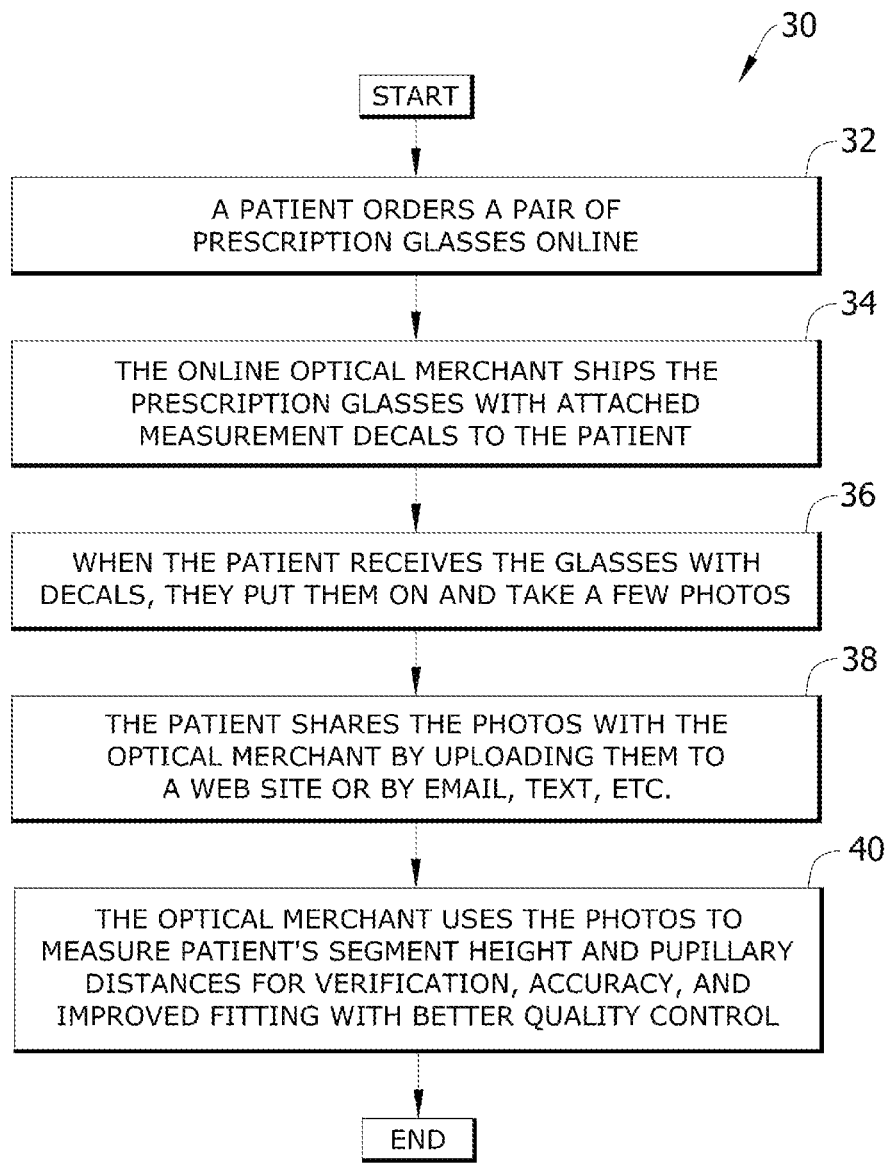
FIG. 4 conceptually illustrates a method for using the measurement decals with eyeglasses by a patient to provide segment height and pupillary distance measurement data to an eyeglasses supplier to enhance fit based on the measurement data in some embodiments.

By way of example, FIG. 4 conceptually illustrates a method for using the measurement decals with eyeglasses by a patient to provide segment height and pupillary distance measurement data to an eyeglasses supplier 30 to enhance fit based on the measurement data. As shown in this figure, the method for using the measurement decals with eyeglasses by a patient to provide segment height and pupillary distance measurement data to an eyeglasses supplier 30 starts when a patient orders a pair of prescription glasses online (at 32). For example, the patient may access a website of an online optical merchant, input prescription data, personal information, shipping address, payment information, etc., and complete a transaction to order the prescription glasses from the online optical merchant.

In some embodiments, the method for using the measurement decals with eyeglasses by a patient to provide segment height and pupillary distance measurement data to an eyeglasses supplier 30 continues with the online optical merchant shipping the prescription glasses with attached measurement decals to the patient (at 34). Next, when the patient receives the prescription glasses with the measurement decals from the online optical merchant, the patient then puts the prescription glasses on (without removing the measurement decals) and takes one or more photographic images (at 36). The patient may take the images with a digital camera on a tripod, for example, with a remote trigger to capture the image, or another person can take the images of the patient wearing the prescription glasses with measurement decals. The more straight forward the image that is captured, the better the measurement decals will provide accurate segment height and pupillary distance measurements for the online optical merchant to work with. Similarly, the better the ambient lighting in and around the place of the patient while the image is captured, the more clear the resulting image will be for the online optical merchant to work with.

In some embodiments, the method for using the measurement decals with eyeglasses by a patient to provide segment height and pupillary distance measurement data to an eyeglasses supplier 30 continues with the patient sharing the photographic image(s) with the optical merchant by uploading (at 38) the images to a web site of the online optical merchant or a cloud resource/service hosted on behalf of the online optical merchant, or any other data transfer method, including, without limitation, email transfer (by attachment of individual captured images), text message transfer (with image transfer), etc. During the next step of the method for using the measurement decals with eyeglasses by a patient to provide segment height and pupillary distance measurement data to an eyeglasses supplier 30, the online optical merchant uses the images to measure the patient's segment height and pupillary distances (at 40) for verification, accuracy, and improved fitting with better quality control. Then the method for using the measurement decals with eyeglasses by a patient to provide segment height and pupillary distance measurement data to an eyeglasses supplier 30 ends.

By following the above listed steps, the accuracy of the prescription eyewear can be verified and more accurately remade if required. As noted above, the measurement decals (on sheet) can be extended to cover the temples (frame arms) to measure proper temple length (by side view). Furthermore, the marked and scaled adhesives can be used on sample frames that can be shipped to the patient prior to ordering, thereby allowing for measurements before new prescription glasses are made, increasing their accuracy even more. Similarly, the same idea can be applied for other remote photographic measurements. For example, transparent scaled plastic can be used on faces for video/photos to generate 3D model of individual faces or head with accurate measurements. Along with 3D models of frames, people can try fittings of eyeglass frames in three dimensions virtually.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method for adjusting prescription eyeglasses at a remote location to enhance fit based on measured data of a user of the eyeglasses, said method comprising:
    adhering a pair of measurement decals to a pair of lenses of an eyeglass frame of a user;
    capturing a front image of the eyeglass frame and the pair of measurement decals when disposed around a head and centered over eyes of the user;
    providing the front image to a remote location; and
    performing an adjustment to the eyeglass frame and lenses at the remote location based on the front image.

2. The method for adjusting prescription eyeglasses at a remote location of claim 1, wherein each measurement decal comprises pupillary distance ruler markings and segment height ruler markings.

3. The method for adjusting prescription eyeglasses at a remote location of claim 2, wherein the front image includes eyes of the user centered according to the segment height ruler markings and the pupillary distance ruler markings.

4. The method for adjusting prescription eyeglasses at a remote location of claim 3, wherein the segment height ruler markings measure segment height of the eyes of the user and pupillary distance ruler markings measure monocular and binocular pupillary distance of the eyes of the user for improved eyeglass fitting.

5. The method for adjusting prescription eyeglasses at a remote location of claim 1, wherein the remote location comprises a particular location of an online optical merchant.

6. The method for adjusting prescription eyeglasses at a remote location of claim 5, wherein the particular location of the online optical merchant is different from a physical location of the user.

7. The method for adjusting prescription eyeglasses at a remote location of claim 5, wherein providing the front image to the remote location comprises electronically transferring the front image to a cloud server that hosts a web site that is associated with and accessible to the online optical merchant.

8. The method for adjusting prescription eyeglasses at a remote location of claim 5, wherein providing the front image to the remote location comprises electronically transferring the front image to the online optical merchant via email.

9. The method for adjusting prescription eyeglasses at a remote location of claim 5 further comprising ordering a pair of prescription glasses by the user from the online optical merchant.

10. The method for adjusting prescription eyeglasses at a remote location of claim 9, wherein the user connects to a website of the online optical merchant with a user computing device to order the pair of prescription glasses from the online optical merchant.

\* \* \* \* \*